United States Patent [19]

Shinozaki et al.

[11] Patent Number: 5,045,873
[45] Date of Patent: Sep. 3, 1991

[54] MOTOR DRIVEN SHUTTER

[75] Inventors: Nobuo Shinozaki; Hiroto Tsuyuki, both of Yotsukaido, Japan

[73] Assignee: Seikosha Co., Ltd., Tokyo, Japan

[21] Appl. No.: 522,424

[22] Filed: May 11, 1990

[30] Foreign Application Priority Data

May 12, 1989 [JP] Japan ................................ 1-55046[U]

[51] Int. Cl.⁵ .............................................. G03B 9/08
[52] U.S. Cl. ................................................ 354/234.1
[58] Field of Search ............... 354/234.1, 235.1, 195.1, 354/195.11

[56] References Cited

U.S. PATENT DOCUMENTS 2,347,699  5/1944  Magnus et al. ................... 354/234.1

Primary Examiner—Russell E. Adams
Assistant Examiner—Howard B. Blankenship
Attorney, Agent, or Firm—Jordan and Hamburg

[57] ABSTRACT

A mechanism for opening and closing a shutter includes a rotatably mounted drive member, a motor operable to rotatably drive the drive member, an actuator for opening and closing the shutter when the drive member is rotated, and an operating arrangement between the drive member and the actuator operable to provide a gear driving operating relationship between the drive member and the actuator during one part rotation of the drive member and a non-driving relationship during another part rotation of the drive member.

10 Claims, 2 Drawing Sheets

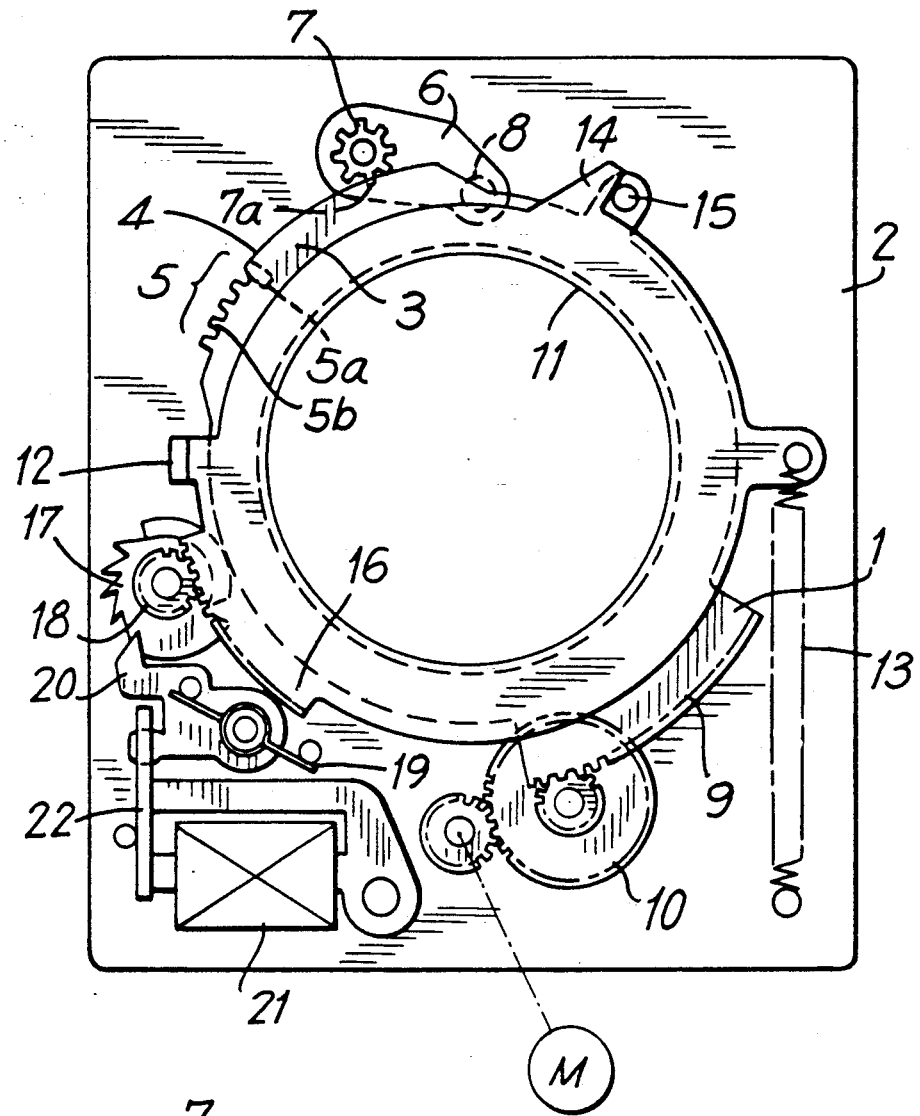
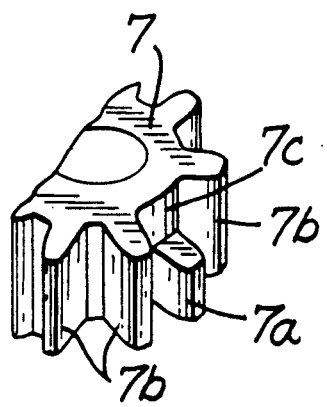
FIG.1
FIG.2(a)
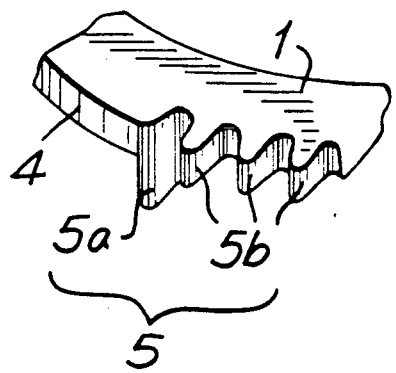
FIG.2(b)

MOTOR DRIVEN SHUTTER

BACKGROUND OF THE INVENTION

1. Field of the Invention

The present invention relates to a motor driven shutter for use in an automatic focusing and exposing compact camera.

2. Description of the Related Art

A modern compact camera typically includes a motor driven shutter so as to photograph according to predetermined lens aperture and shutter speed. FIG. 3 shows a typical example of such a motor driven shutter which includes a drive ring 101 rotatably fitted in the opening of an objective lens and having a cam 102. An operating lever 103 is rotatably mounted contiguously of the cam 102 and has a pin 104 thereon. The lever 103 is spring biased to allow the pin 104 to contact the cam 102. The operating lever 103 is active to open and close a shutter blade (not shown) which is, in turn, arranged in covering relation to the opening of the objective lens and acts as a lens aperture controller as well as a shutter.

The compact camera includes a microcomputer operable to send a signal to a stepper motor M so as to rotate the drive ring 101 in a reverse direction. The pin 104 is then moved up and down along the cam 102 to rotate the operating lever 103. This causes opening and closing of the shutter blade. This shutter blade is opened and closed in a response to a lens aperture and shutter speed program as determined in accordance with the standard exposure.

With such a conventional motor driven shutter, the cam 102 and the pin 104 cooperatively constitute a means for transmitting rotation of the drive ring 101 to the operating lever 103. To provide greater lens aperture and higher shutter speed, the stepper motor M must be immediately rotated in a reverse direction so as to rapidly and substantially open and close the shutter blade while the pin 104 is being vertically moved along the cam 102. Such rapid and substantial opening and closing of the shutter blade may cause the pin 104 to separate from the cam 102 due to the resultant inertia. Thus, when the stepper motor M is immediately rotated in a reverse direction, opening and closing of the shutter blade may be delayed. This adversely affects the performance of the shutter blade in response to the rotation of the stepper motor M at high speeds. As a result, the shutter blade may not be opened and closed in response to the predetermined lens aperture and shutter speed. Therefore, appropriate exposure can not be obtained.

A stronger spring may be used to urge the pin 104 and the cam 102 so as to prevent separation of the pin 104 from the cam 102. However, such an arrangement results in the rise of friction therebetween. The stepper motor M is thus subjected to greater loads, adversely affecting the performance of the stepper motor M during high speed rotation and consuming more electric current.

Alternatively, a pin may be loosely fit in a groove formed in a cam as disclosed in Japanese laid-open patent publication No. Sho 61/9631. This arrangement provides better response of the shutter blade relative to the stepper motor at high speeds, but the drive member requires a greater amount of space. The motor driven shutter may not, therefore, be used to provide a compact arrangement.

SUMMARY OF THE INVENTION

In order to overcome the foregoing problems, a motor driven shutter according to the present invention comprises a drive member movable in opposite directions, a motor for moving the drive member in such opposite directions, and an operating lever for opening and closing a shutter blade through transmission means when the drive member is moved by the motor, the transmission means including a gear mechanism having a notch therein.

In order to provide larger lens apertures and higher shutter speeds, the motor is active to substantially rotate the drive member in a clockwise direction and immediately thereafter rotate in a reverse or counterclockwise direction. The resultant inertia may be imposed on the gear mechanism disposed between the drive member and the operating lever. As components of the gear mechanism are in mesh with one another, the operating lever positively follows the drive member during high speed rotation. Therefore, no spring as in a conventional shutter is required.

The drive ring may be disposed in surrounding relation to the opening of the shutter blade to open and close the shutter blade. This arrangement does not consume an excessive amount of space as opposed to a conventional shutter as disclosed in the aforementioned Japanese laid-open patent publication No. Sho 61/9631. The shutter of the present invention can be structured to occupy just the same amount of space as that taken up by the arrangement shown in FIG. 3.

The above and other objects, advantages, and features of the present invention will become more apparent from the following detailed description of a preferred embodiment when taken in conjunction with the accompanying drawings.

BRIEF DESCRIPTION OF THE DRAWINGS

FIG. 1 shows a motor driven shutter, in its initial position, according to one embodiment of the present invention;

FIG. 2A is a perspective view of a pinion mounted on an operating lever;

FIG. 2B is a perspective view of a gear portion formed in a drive member; and

DESCRIPTION OF THE PREFERRED EMBODIMENTS

Figure 3:
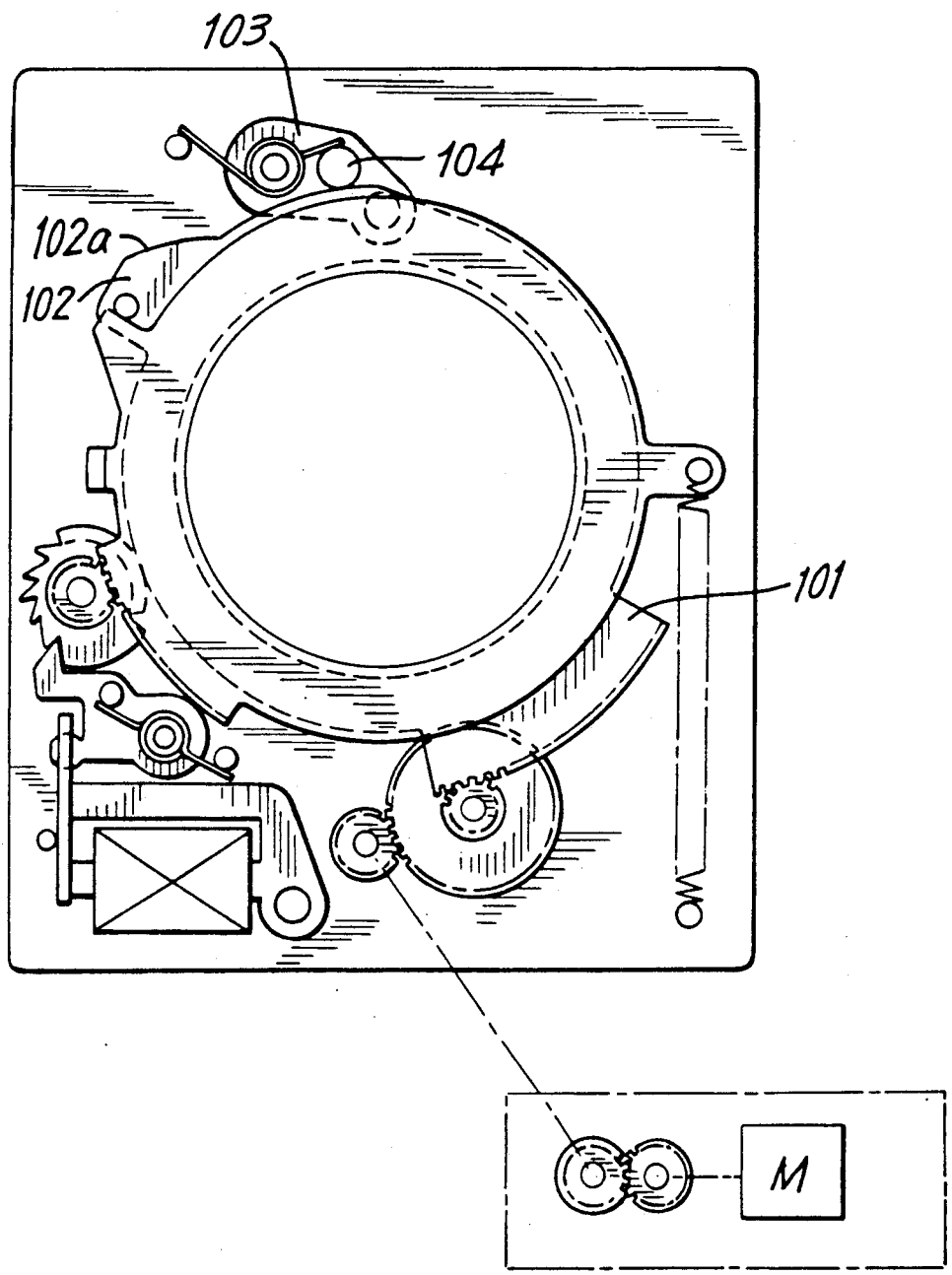
FIG. 3 shows a conventional motor driven shutter in its initial position.

FIGS. 1 and 2 show a motor driven shutter according to one embodiment of the present invention. With reference first to FIG. 1, the motor-driven shutter is held in an initial position. Reference numeral 1 designates a substantially annular drive ring rotatably supported on a fixed base plate 2. An objective lens (not shown) is mounted on the fixed base plate 2 in juxtaposed relation to the drive ring 1. The drive ring 1 has an operating section 3 at its outer periphery. The operating section 3 has an arcuate portion 4 projecting radially outwardly from the periphery of the drive ring 1 and a gear portion 5 formed at the left side of the arcuate portion 4 in FIG. 1.

An operating lever 6 is rotatably supported on the base plate 2 adjacent to the operating section 3 and includes a pin 8 on its free end (right end in FIG. 1). A shutter blade (not shown) is engaged with the pin 8 and arranged in covering relation to the objective lens. The shutter blade acts as a lens aperture controller as well as a shutter. Clockwise and counterclockwise rotation of the operating lever 6 cause opening and closing of the shutter blade. The drive ring 1 also has a sector gear portion 9 in mesh with an idler gear 10 and is driven for rotation by a stepper motor M through the idler gear 10 and the like.

A focusing or distance-setting ring 11 is mounted on the base plate 2 in juxtaposed relation to the drive ring 1 and has a lens drive projection 12 formed at its outer periphery and engageable with a helicoid member (not shown). Upon rotation of the distance ring 11, the objective lens is moved to a focus position by the helicoid member.

A spring 13 is disposed between the focusing ring 11 and the fixed plate 2 to normally urge the focusing ring 11 in a clockwise direction. The focusing ring 11 has a projection 14, and the drive ring 1 has a pin 15. The projection 14 is pulled by the spring 13 to contact the pin 15.

The focusing ring 11 has a sector gear portion 16 in mesh with a pinion 18 of a ratchet wheel 17. Adjacent to the ratchet wheel 17, a lever or pawl 20 is mounted for engagement with the ratchet wheel 17 under the action of a coil spring 19. The pawl 20 is disengaged from the ratchet wheel 17 when an armature 22 is attracted to an electromagnet 21 after the focusing ring 11 has been rotated in a reverse direction in FIG. 1.

The pinion 7 of the operating lever 6 is engageable with the gear portion 5 of the operating section 3. As shown in FIG. 2A, the pinion 7 has a plurality of teeth, one 7a of which has a thickness approximately half of that of each of the other teeth 7b. The tooth 7a has a cut-out portion or notch 7c in abutment with the arcuate portion 4 of the operating section 3 shown in FIG. 2B. The thickness of the arcuate portion 4 is equal to the width of the notch 7c. To this end, the tooth 5a of the gear portion 5 located contiguously of the pinion 7 is thicker than the other teeth so that it can be engaged with the tooth 7a. With this arrangement, the pinion 7 will not be rotated while the arcuate portion 4 is held in sliding contact with the notch 7c of the tooth 7a during clockwise rotation of the operation section 3. However, the pinion 7 is rotated when the tooth 5a of the gear portion 5 is brought into meshing engagement with the tooth 7a of the pinion 7. Such a notched gear mechanism constitutes a means for transmitting rotation of the drive ring 1 to the operating lever.

Operation

A signal indicative of program information, ISO information, or zoom information is fed to an arithmetic unit. Also, a photometer, an automatic focusing system, and a memory sends signals thereto. This arithmetic unit is active to determine appropriate lens aperture and shutter speed with respect to the standard exposure and send a signal to a drive unit so as to rotate the stepper motor M in a reverse direction. The rotation of the stepper motor M is then transmitted to the drive ring 1 through the idler gear 10, the sector gear 9 and so on. The drive ring 1 is thereby rotated in a counterclockwise direction. This causes the pin 15 to push the projection 14 so as to rotate the focusing ring 11 in a counterclockwise direction against the action of the spring 13.

When the focusing ring 11 is rotated in a counterclockwise direction, the ratchet wheel 17 is rotated in an opposite or clockwise direction. This causes the pawl 20 to disengage from the ratchet wheel 17. At this time, the arithmetic unit provides a signal whereby the electromagnet 21 is energized to attract the armature 22. The pawl 20 is then kept away from the ratchet wheel 17.

When the stepper motor M is rotated in a clockwise direction, the drive ring 1 is rotated in the same direction. Simultaneously, the focusing ring 11 is rotated in the same direction against the action of the spring 13. The objective lens is brought into focus when the stepper motor M has been rotated an angle indicated by a signal fed from the arithmetic unit.

At this time, the arcuate portion 4 of the operating section 3 is held in sliding contact with the notch 7c of the pinion 7, whereas the tooth 7a is out of engagement with the tooth 5a of the gear portion 5. As a result, the pinion 7 will be in no way rotated by the gear portion, and the shutter blade, as engaged with the pin 8, is kept in position to keep the opening of the objective lens closed.

The stepper motor M is temporarily stopped when the objective lens is brought into focus. Thereafter, the arithmetic unit sends a signal to a drive unit so as to deenergize the electromagnet 21. The pawl 20 is then brought into meshing engagement with the ratchet wheel 17 under the action of the coil spring 19 to prevent rotation of the ratchet wheel 17. Since the focusing ring 11 is in mesh with the ratchet 17, it will never be rotated in a clockwise direction even if the drive ring 1 is further rotated in a clockwise direction. The objective lens is, thus, kept in a focus position.

Next, when only the drive ring 1 is further rotated in a clockwise direction, then the tooth 5a of the gear portion 5 is first brought into meshing engagement with the tooth 7a of the pinion 7. The other teeth 5b of the gear portion 5 then come into meshing engagement with the other teeth 7b of the pinion 7 to thereby rotate the pinion 7 in a counterclockwise direction. Simultaneously, the operating lever 6 is rotated in the same direction to open the shutter blade until the target aperture is obtained.

The stepper motor M is stopped when it has been rotated at a predetermined angle. The stepper motor M is then rotated in a reverse direction at an appropriate speed as determined by the arithmetic unit. This causes the drive ring 1 to rotate in a reverse or counterclockwise direction. The pinion 7 and the operating lever 6 are, in turn, rotated in a clockwise direction by the gear portion 5 so as to close the shutter blade. The stepper motor M is again rotated in a reverse direction so as to rotate the drive ring 1 in a counterclockwise direction. The stepper motor M is stopped when the focusing ring 11 and the ratchet wheel 17 are returned to their initial position.

Again, when the drive ring 1 is rotated in a clockwise direction, the arcuate portion 4 of the operating section 3 is first located in the notch 7c of the pinion 7 to thereby restrict rotation of the tooth 7b. Thus, the operating lever 6 is held in its initial position without the need for a spring as in a conventional shutter. If the drive ring 1 is further rotated in a clockwise direction and thereafter rotated in a counterclockwise direction, then the gear portion 5 of the operating section 3 is brought into meshing engagement with the pinion 7. This causes opening and closing of the shutter blade. In order to provide larger lens apertures and higher shutter speeds, the drive ring 1 must be substantially rotated in a clockwise direction and immediately thereafter rotated in a reverse or counterclockwise direction by means of the stepper motor M so as to substantially and rapidly open and close the shutter blade. Regardless of the resultant inertia, the pinion can properly be rotated in response to angular movement of the gear portion 5 as they are in mesh with one another. The shutter blade can be opened and closed without delay even if the stepper motor M is rapidly rotated in a reverse direction. The shutter blade is highly responsive to the stepper motor during high speed rotation and can be opened and closed according to the programmed lens aperture and shutter speed, thus providing appropriate exposure.

It will be noted that backlash occurs between the teeth 7a, 7b of the pinion 7 and the teeth 5a, 5b of the gear portion 5. The shutter is thus subject to inertia of the shutter blade due thereto. Such inertia is negligible as compared to that in a conventional shutter. Accordingly, it can be seen that the present invention provides a substantial improvement in the performance of a shutter blade in response to a stepper motor M during high speed rotation.

The shutter of the present invention requires no such spring as in a conventional shutter to improve the performance of the shutter blade in response to the stepper motor M during high speed rotation. Also, the stepper motor M is not subject to excess loads as the pinion 7 is in mesh with the gear portion of the operating section 3, thereby improving the performance of the stepper motor M during high speed rotation and reducing the consumption of electric current. According to the present invention, the drive ring 1 surrounds the opening of the shutter so as to open and close the shutter blade. This arrangement does not require an excessive amount of space as opposed to the shutter shown in Japanese laid-open patent publication No. Sho 61/9631 and advantageously, provides a compact motor driven shutter.

In the illustrated embodiment, the drive ring 1 is operatively connected to the operating lever via the notched gear mechanism. Alternatively, an additional gear mechanism may be disposed to operatively connect the drive ring 1 with the operating lever 6, and such notched gear mechanism may be used to operatively connect the additional gear mechanism with the operating lever 6. The operating lever 6 may be in the form of a ring as is well known in the art of a sector operating mechanism.

The gear mechanism may alternatively be in the form of a known Geneva gear in lieu of the notched gear.

A spring may be disposed to unidirectionally urge the operating lever 6 so as to avoid backlash occurring between the teeth 7a, 7b or the pinion 7 and the teeth 5a, 5b of the gear portion 5. This arrangement provides better exposure control.

The motor driven shutter according to the present invention provides means for transmitting rotation of the drive member to the operating lever in the form of a notched gear mechanism. With this arrangement, the operating lever positively follows the drive member if inertia is imposed on the gear mechanism during rapid and substantial opening and closing of the shutter blade. Thus, the shutter blade can be opened and closed without any delay even if the stepper motor is immediately rotated in a reverse direction, thereby providing better performance of the shutter blade in response to the stepper motor during high speed rotation. Accordingly, the shutter blade can be opened and closed in response to the programmed lens aperture and shutter speed so as to provide appropriate exposure.

No such spring as used in a conventional shutter is necessary to improve the performance of the shutter blade in response to the stepper motor during high speed rotation, thus improving the performance of the stepper motor at high speeds and reducing the consumption of electric current.

The shutter blade surrounds the opening of the shutter. This arrangement does not occupy an excessive amount of space, as opposed to the conventional shutter disclosed in Japanese laid-open patent publication No. Sho 61/9631, thus providing for a compact arrangement.

Although the preferred embodiment of the invention has been described by way of example, it is to be understood that many changes and variations may be made therein without departing from the spirit of the invention and the scope of the appended claims.

What is claimed is:

1. A mechanism for opening and closing a shutter means, comprising a rotatably mounted drive member, a motor means operable to rotatably drive said drive member, actuating means for opening and closing said shutter means when said drive member is rotated, and operating means between said drive member and said actuating means operable to provide a gear driving relationship between said drive member and said actuating means during one part rotation of said drive member and a non-driving relationship between said drive member and said actuating means during another part rotation of said drive member, said operating means comprising gear teeth on said actuating means, one of said gear teeth having notch means which is positioned juxtaposed to said drive member to enable said drive member to rotate without driving said actuating means.

2. A mechanism for opening and closing a shutter means, comprising a rotatably mounted rive member having a first section and a second section, a motor means operable to rotatably rive said drive member, actuating means for opening and closing said shutter means when said drive member is rotated, and operating means between said drive member and said actuating means operable to provide a gear driving relationship between said drive member and said actuating means during one part rotation of said drive member and a non-driving relationship between said drive member and said actuating means during another part rotation of said drive member, said operating means comprising drive gear teeth on said first section of said drive member, said second section being devoid of gear teeth, said operating means further comprising driven gear teeth on said actuating means, one of said driven gear teeth having notch means, said drive member being rotatable during said one part rotation such that said drive gear teeth mesh with said driven gear teeth to rotate said actuating means, said drive member being rotatable during said other part rotation such that said second section of said drive member is juxtaposed to said one driven gear tooth so that said drive member is rotatable without rotating said actuating means.

3. A mechanism according to claim 2, wherein said one tooth of said driven gear teeth has one width, the other of said driven gear teeth having another width greater than said one width.

4. A mechanism according to claim 2, wherein one of said drive gear teeth has an extended wide tooth portion engageable with said one gear tooth of said driven gear teeth.

5. A mechanism according to claim 4, wherein said wide tooth portion drives said one gear tooth of said driven gear teeth when said drive member is rotated from said one part rotation to said other part rotation and said operating means passes from said non-driving relationship to said gear driving relationship.

6. A mechanism according to claim 5, wherein said wide tooth portion is disengaged from said one gear tooth of said driven gear teeth when said drive member is rotated from said other part rotation to said one part rotation and said operating means passes from said gear driving relationship to said non-driving relationship.

7. A mechanism according to claim 4, wherein said one tooth of said drive gear teeth has one width, the other teeth of said drive gear teeth having another width less than said one width.

8. A mechanism according to claim 3, wherein the difference between said one and said other width defines the width of said notch means.

9. A mechanism according to claim 2, wherein each of said driven gear teeth other than said one gear tooth having said notch means has a first portion having a width equal to the width of said notch means and a second portion equal to the width of said one gear tooth having said notch means.

10. A mechanism according to claim 9, wherein said drive gear teeth are operable to mesh with said first portion of said driven gear teeth while said other portion of said driven gear teeth are in non-gear meshing relationship with said drive gear teeth.

* * * * *